Patented Apr. 7, 1936

2,036,638

UNITED STATES PATENT OFFICE 2,036,638

PARASITICIDE

Frank Floyd Lindstaedt, Oakland, Calif., assignor, by mesne assignments, to Grover D. Turnbow, Oakland, Calif.

No Drawing. Application June 15, 1929,
Serial No. 371,302

12 Claims. (Cl. 167—53)

My invention relates to toxic substances, and particularly to parasiticides for internal use in animals, such as dogs, chickens and cattle.

My invention has for its chief object the preparation of a parasiticide which may be administered internally, and which will effectively destroy or cause an expulsion of parasites such as round worms, without destroying the life of the animal.

Another object of the invention is the provision of a parasiticide which will not cause serious illness in the animal after being administered.

My invention possesses other objects and valuable features, some of which will be set forth in the following description of my invention. It is to be understood that I do not limit myself to the showing made by the said description, as I may adopt varying forms of my invention within the scope of the claims.

Alkaloidal substances such as nicotine, coniine, or their salts such as the sulphates, in sufficient quantity, are effective for destroying parasites such as round worms in animals. If any of these substances are administered alone, it has been found that quantities thereof sufficient to destroy the parasites will also destroy the life of the animal. For example, 5 to 10 milligrams of an alkaloidal substance, such as pure nicotine or nicotine sulphate, is a lethal dose when placed in the mouth of a chicken. Quantities less than this amount are not efficient for the destruction of the parasites. In view of this, the use of these compounds alone is impractical.

The composition of my invention is designed to overcome the described difficulty; and in terms of broad inclusion, it comprises a toxic substance such as an alkaloidal substance, in quantity sufficient to destroy internal parasites, and a substance which protects against the effect of a normally lethal dose of the toxic substance. I have found a number of the latter substances which are suitable for the purposes described. When the toxic substance is used with any of these substances, a quantity, in excess of that which is normally a lethal dose, may be employed, thus effecting an efficient and thorough destruction of internal parasities. As an example, 70 to 80 milligrams of alkaloidal substance may be administered in this fashion to a chicken, without destroying its life.

With reference to the preferred embodiment of my invention, I have chosen for illustration, the quantities of toxic substance and other ingredients, especially applicable for destroying round worms in chickens.

In greater detail, the parasiticide of my invention comprises the product resulting from the combination of an alkaloidal substance such as coniine, nicotine, or their salts such as the sulphates or nitrates, and an organic substance of colloidal nature. An organic substance of colloidal nature is preferred due to the fact that such substance forms with an alkaloidal substance a product which provides efficacious and thorough destruction of parasites such as round worms. Also, with an organic substance of colloidal nature, relatively large quantities of alkaloidal substance may be administered therewith, without undue shock to the animal. Proteins such as hide-glue, casein powder, peanut meal, pea meal and soy bean meal, are some of the substances of colloidal nature which are satisfactory; substances such as kamala powder, tragacanth powder, powdered Indian gum, powdered agar-agar and powdered shellac, all of the class of gums and resins, are also satisfactory; also, powdered starch, which is a carbohydrate, and powdered soap, may be used.

In preparing the parasiticide, it is preferred to form approximately one gram pellets, containing 70 to 80 milligrams of any of the described alkaloidal substances and about 900 to 1000 milligrams of any of the described substances of colloidal nature. The pellets may be prepared by thoroughly mixing, in a large batch, suitable quantities of the alkaloidal substance and the finely divided substance of colloidal nature; drying at a moderate temperature insufficient to cause excessive volatilization of the alkaloidal substances, but sufficient to cause loss of excess moisture; and, after the mass has dried and the substances uniformly distributed, compressing portions thereof in approximately one gram pellets by any suitable or known means. A temperature of 50° C. to 100° C. maintained for about 1 hour to 2½ hours has been found preferable for effecting the drying of the mass.

Instead of forming pellets containing only the alkaloidal substance and the substance of colloidal nature, fillers such as powdered soap or powdered sugar may be substituted for a portion of any of the colloidal substances. Powdered soap itself is effective to protect against the effect of a normally lethal dose of the alkaloidal substance, and may be used in any proportions. However if sugar is used as the filler, each pellet should contain at least 450 milligrams of the colloidal substance.

The product resulting from the combination of a colloid with the alkaloid is chiefly an adsorption and/or absorption product of the alkaloidal substance by the substance of colloidal nature. In this condition the toxic substance cannot pass thru the semi-permeable lining of the stomach and into the system. In the claims the phrase "colloidally held" is used to mean "absorbed and/or adsorbed".

As the preferred alkaloidal substance, I employ nicotine, either synthetic or that derived from tobacco, or any of its salts. As the salt, nicotine sulphate is preferred due to its commercial availability and lower cost. Commercial nicotine—that derived from tobacco—contains other alkaloidal substances such as nicoteine and nicotelline, which are also effective for the purposes described and react in a manner similar to that of nicotine.

I have found that kamala, a resinous excretion from a species of tree, possesses special advantages when used as the substance to protect against the effect of a normally lethal dose of the alkaloid. This is due to the fact that kamala is itself a parasiticide capable of destroying tape worms. A peculiarity of the kamala—alkaloidal substance parasiticides is the fact that the reaction product of kamala and free alkaloid, such as free nicotine, does not produce heavy diarrhea, which generally occurs when kamala is administered alone to destroy tape worm, or when the adsorption and/or absorption product of kamala and an alkaloidal salt such as nicotine sulphate, is used.

Besides the use of the substances described to protect against the effects of a normally lethal dose of any of the described alkaloidal substances, I have found that similar results may be obtained by placing a quantity above the normally lethal dose of the alkaloidal substance (70–80 milligrams) in a gelatine capsule which may be administered internally.

Although the above proportions of the ingredients of my parasiticide are those preferably employed for use in animals such as chickens, the quantities thereof may be varied in accordance with the animal to be treated. For example dogs will stand a larger dose of the alkaloidal substance. The quantities may be readily determined by those skilled in the art, in accordance with the teachings of this invention.

I claim:

1. A parasiticide for internal use consisting of a pellet comprising the product resulting from the combination of a toxic substance in quantity greater than the normally lethal dose, and a substance of colloidal nature for colloidally holding the toxic substance to protect against the effect of such dose.

2. A parasiticide for internal use comprising a toxic substance in quantity greater than the normally lethal dose and a colloidal substance for colloidally holding the toxic substance to protect against the lethal effect of such dose.

3. A parasiticide for internal use comprising a lethal sized dose of an alkaloidal substance combined into a colloidal substance adapted to colloidally hold the alkaloidal substance and protect against the lethal effect of said alkaloid.

4. A medicinal compound comprising a normally toxic substance incorporated in agar agar in proportions to render said substance substantially non-toxic to fowls when given in quantities sufficient to destroy parasites of the intestinal tract.

5. A medicinal compound comprising agar agar and nicotine substance, said compound being non-toxic to fowls when given in quantities sufficient to destroy parasites of the intestinal tract.

6. A non-lethal parasiticide for internal administration, for intestinal parasites, comprising the combination of an alkaloid in a dose normally parasiticidal to said parasites and lethal to the subject being treated on ingesting the same alone, and an organic colloid, said organic colloid rendering said dose non-lethal to the subject being treated and leaving it parasiticidal to said parasites.

7. A non-lethal parasiticide for internal administration, for intestinal parasites, comprising the combination of an alkaloid in a dose normally parasiticidal to said parasites and lethal to the subject being treated on ingesting the same alone, and kamala, said kamala rendering said dose non-lethal to the subject being treated and leaving it parasiticidal to said parasites.

8. A non-lethal parasiticide for internal administration, for intestinal parasites, comprising the combination of a nicotine substance in a dose normally parasiticidal to said parasites and lethal to the subject being treated on ingesting the same alone, and an organic colloid, said organic colloid rendering said dose non-lethal to the subject being treated and leaving it parasiticidal to said parasites.

9. A non-lethal parasiticide for internal administration, for intestinal parasites, comprising the combination of a nicotine substance in a dose normally parasiticidal to said parasites and lethal to the subject being treated on ingesting the same alone, and kamala, said kamala rendering said dose non-lethal to the subject being treated and leaving it parasiticidal to said parasites.

10. A non-lethal parasiticide for internal administration, for intestinal parasites, comprising the combination of a free nicotine substance and kamala, said nicotine substance being present in a dose normally parasiticidal to said parasites and lethal to the subject being treated on ingesting the same alone, said kamala being present in a dose normally causing heavy diarrhea in said subject being treated on ingesting the same alone, said kamala rendering said dose of nicotine substance non-lethal to the subject being treated and leaving it parasiticidal to said parasites, said nicotine rendering said kamala non-productive of heavy diarrhea.

11. A medicinal compound comprising a toxic substance in quantity greater than the normal lethal dose and casein for holding the toxic substance to protect against the lethal effect of such dose.

12. A medicinal compound comprising nicotine in quantity greater than the normal lethal dose and casein for holding the toxic substance to protect against the lethal effect of such dose.

FRANK FLOYD LINDSTAEDT.